(12) United States Patent
Vasko (10) Patent No.: US 9,092,120 B2
(45) Date of Patent: Jul. 28, 2015

(54) SYSTEM AND METHOD FOR CREATING A CONNECTED MARKET USING SOCIAL MEDIA INTERACTION UNITS AND INTERACTIVE PROCESS GADGETS

(76) Inventor: Timothy S. Vasko, Victoria (CA)

( * ) Notice: Subject to any disclaimer, the term of this patent is extended or adjusted under 35 U.S.C. 154(b) by 457 days.

(21) Appl. No.: 13/474,606

(22) Filed: May 17, 2012

(65) Prior Publication Data

US 2013/0132860 A1 May 23, 2013

Related U.S. Application Data

(60) Provisional application No. 61/487,195, filed on May 17, 2011.

(51) Int. Cl.
*G06F 17/00* (2006.01)
*G06F 3/0484* (2013.01)
*G06Q 30/02* (2012.01)
*G06Q 50/00* (2012.01)

(52) U.S. Cl.
CPC .............. *G06F 3/0484* (2013.01); *G06Q 30/02* (2013.01); *G06Q 50/01* (2013.01)

(58) Field of Classification Search
CPC ...................................................... G06Q 50/01
USPC .......................................... 715/753, 234, 200
See application file for complete search history.

(56) References Cited

U.S. PATENT DOCUMENTS

| | | | |
|---|---|---|---|
| 7,756,926 B2* | 7/2010 | Tseng et al. ................... 709/204 |
| 8,666,826 B2* | 3/2014 | Narayanan et al. .......... 705/26.1 |
| 2008/0052203 A1* | 2/2008 | Beyer et al. ..................... 705/28 |
| 2010/0114691 A1* | 5/2010 | Wu et al. .................... 705/14.44 |
| 2010/0287256 A1* | 11/2010 | Neilio ........................... 709/217 |
| 2011/0071950 A1* | 3/2011 | Ivanovic ....................... 705/304 |
| 2011/0078584 A1* | 3/2011 | Winterstein et al. .......... 715/751 |
| 2011/0083101 A1* | 4/2011 | Sharon et al. ................. 715/800 |
| 2012/0116836 A1* | 5/2012 | Flores et al. ................. 705/7.27 |
| 2012/0221372 A1* | 8/2012 | Vasko .......................... 705/7.26 |
| 2013/0326467 A1* | 12/2013 | Nair et al. ..................... 717/101 |
| 2014/0350997 A1* | 11/2014 | Holm et al. ................. 705/7.26 |

* cited by examiner

*Primary Examiner* — Manglesh M Patel
(74) *Attorney, Agent, or Firm* — Davis & Bujold, P.L.L.C.; Michael J. Bujold

(57) ABSTRACT

A user interface associated with interactive, multi-dimensional gadgets that interact across and through one another—via programmatic interfaces made available by feeds from outside sources, and user input. The gadgets operate interactively to create work flows.

12 Claims, 8 Drawing Sheets

SYSTEM AND METHOD FOR CREATING A CONNECTED MARKET USING SOCIAL MEDIA INTERACTION UNITS AND INTERACTIVE PROCESS GADGETS

CROSS-REFERENCE TO RELATED APPLICATIONS

This application claims the benefit of U.S. Patent Application No. 61/487,195 filed in the USPTO on May 17, 2011 by the same inventor entitled METHOD FOR CREATING A CONNECTED MARKET USING SOCIAL MEDIA INTERACTION UNITS AND INTERACTIVE PROCESS GADGETS.

FEDERAL FUNDING

N/A

FIELD OF THE INVENTION

This invention relates to means or steps for enabling collaborative processing of data by computers or digital data processing systems and in particular interactive process gadgets and social media interaction units.

SUMMARY

The invention of interactive gadgets is a system involves a series of multi-dimensional work flows and state machines allowing interaction across gadgets that function as separate programs—interactive process spaces are then created. The interactive gadgets derive feeds from allowed integration elements from external sources, including social media application program interface feeds, data ODBC and XML components, RSS feeds, and any other type feed, which provide data into the system for user interface and interaction. The interactive gadgets function to allow communication between sources in the environment where a user can interact and receive and deliver information. Furthermore the gadgets track information and interaction of the users, which tag content through the use of "Smart Tags" which are created by the users or by the actions of the users—a user interface known as 1to1ME Social Spaces & Communication Spaces is created. The interaction between functional feeds and gadgets, combined with the ability to tag and store data, allow for a unique function set enabling process.

Through the ability of interactive gadgets, a series state machine and work flow engine processes can be called.

An interactive user interface, based on feeds that are interactive between gadgets, is a process which creates a multi-dimensional capability through the calls upon data and actions from traditional linear functions in feeds to the user in a single model. This function of interaction, via user interface gadgets, with the users performing the redaction (the redactors) add process completely new elements of their own—which are subjects of this patent such as Smart Tags, or Tags on Meta Data, Captured data, data about data, which results in a algorithmic structure that provides relationships, and therefore capabilities in modifying front end user interactions and abilities, and back end work flow calls related to processes. This has the effect of creating an entirely new state machine flow, algorithm, functional user interface, interaction and communication model—alongside an opportunity for the redactor (users) to measure and control data elements. Via the unique user interface created with gadgets that interact through the gadget based redactors, new information, data and interactions are made possible.

DESCRIPTION OF THE INVENTION

Figure 1:
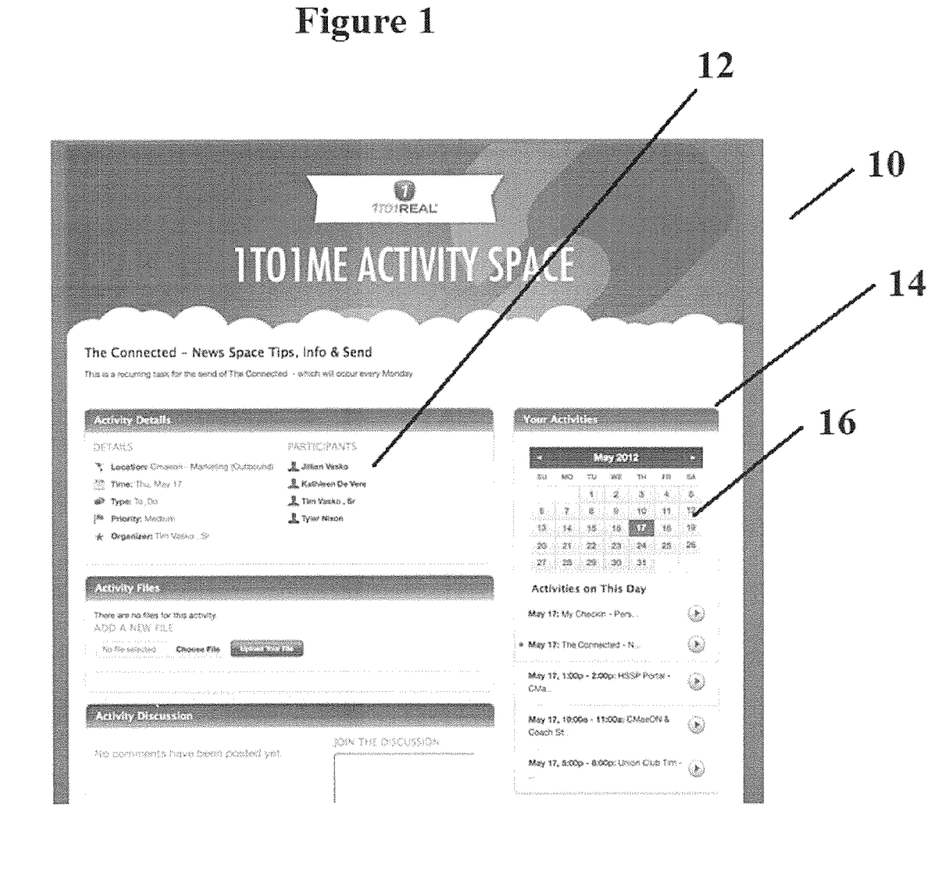
FIG. 1 illustrates one example of a space created by one embodiment of the invention.
Figure 1A:
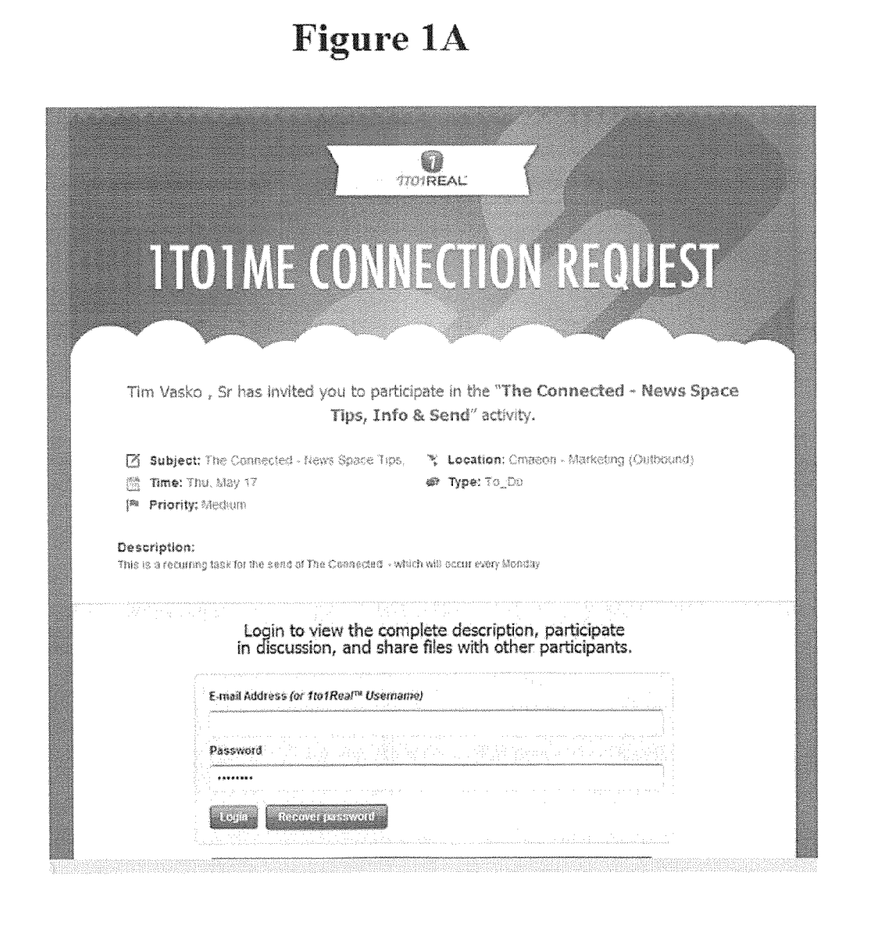
FIG. 1A illustrates one example of an invitation to join an activity space.

Multi-Dimensional State Machine Interception, Interactive, Connection Redactor Process Gadgets The invention is a system and method that involves a series of multi-dimensional work flows and state machines allowing interaction across gadgets that function as separate programs—interactive process spaces are then created. Spaces are a combination of gadgets and created through the interaction of gadgets. These "spaces" are thus shared between users, and then, later defined by the users themselves, based on the interaction of gadgets. In this way, a process flow chain begins to emerge, again calling all of the interaction and activity between actions. Referring to FIG. 1, there is shown one example of a space created by one embodiment of the invention comprising a "1 To 1 Me Activity Space" 10 which is shared between users 12 and lists activities 14 over a time period 16 represented by a calendar. Referring to FIG. 1A it is possible to invite other participants to join a particular activity space.

Two gadgets can operate independently. They are not co-dependent. They subscribe to the message bus which can communicate both with the client as well as over the server.

Figure 2:
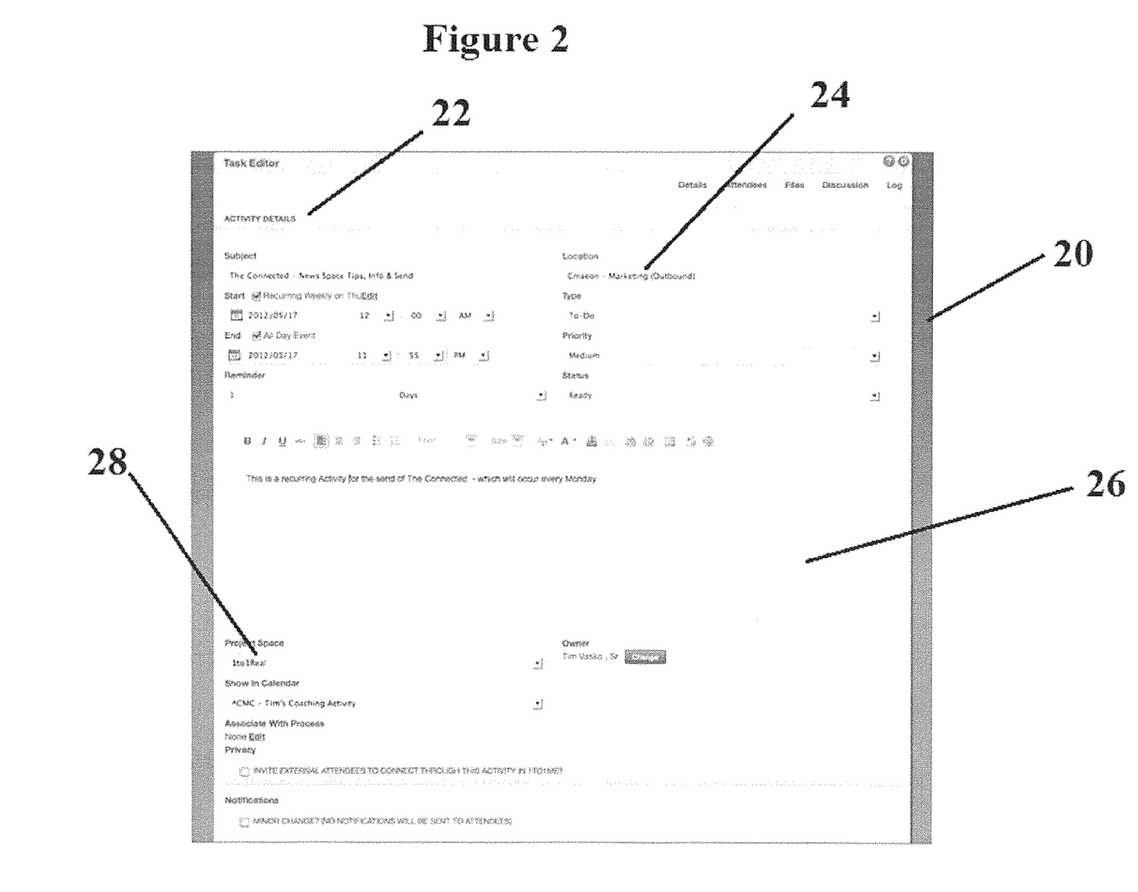
FIG. 2 is a task editor of one embodiment of the invention.

Gadgets themselves are full-fledged objects. They have their own behavior and they can request the use of that behavior between gadgets. A good example is a gadget lets a user edit an activity or task. Referring to FIG. 2, there is shown one example of a task editor 20 comprising activity details 22, location 24, description 26 and the project space to which the task belongs 28. The user can edit or complete the task, and then return to where they were, or move forward to what has been created or called. Gadgets act like a service, or series of services, that track the process. They are building blocks of services looking at other services to perform a series of intended services without dictating a static work flow or process.

There are multiple aspects to communication that are referenced in the terms of interaction across gadgets:

1) where one gadget requests a service to be performed of another.
2) where a gadget makes a change, and another gadget is updated through the message bus, and or,
3) the combination of the gadgets across they types of services they perform In this way the user interaction forum is dynamically creating a work flow environment based on how interactions are created across any interaction of users or automation of tasks. Thus, if a series of highly active interactive gadgets are engaged the work flows or users may dynamically be changing, and thereby creating new user and process behaviors in and of themselves. Thus, this creates a dynamic direction creation, which can be captured and modeled, over time, as to, for one of many examples, best practices to an outcome.

The interactive gadgets derive feeds from allowed integration elements from external sources, including social media application program interface feeds, data ODBC and XML components, RSS feeds, and any other type feed, which provide data into the system for user interface and interaction. The interception, interactive gadgets function to allow communication between sources in the environment, where a user can interact and receive and deliver information. Further, the gadgets track information and interaction of the users, which tag content. Tagging allows for relationships between data. Legacy data can be related in different ways through the use of gadgets, and tagging is the mechanism that creates the layer of functions to data. Tagging, then, becomes a meta-data layer, that can be set initially, and or created automatically. As users see data in a different way, tagging allows for the relationship between users use cases, data creation, and relationships to the data.

Smart tags are tags with behavior. Smart tags go beyond tags that are text base, but extend to behavior. Smart tags can stimulate behavior based on a tag that is attached to a piece of data—thus creating an action. The behavior can make a call to a gadget, which then will executive a program or begin a process flow chain. A smart tag can direct and accept behaviors from users or can capture behaviors of users or, even of processes created by gadgets, etc. and tag these processes to create a new behavior. Through the use of "Smart Tags" which are created by the users or by the actions of the users—a user interface known as 1to1ME Social Spaces & Communication Spaces is created. The interaction between functional feeds and gadgets, combined with the ability to tag and store data, allow for a unique function set enabling process.

Through the ability of interactive gadgets a series state machine and work flow engine processes can be called. This process is described in my co-pending application U.S. Ser. No. 13/368,893 SYSTEM AND METHOD FOR AN INTEGRATED WORKFLOW PROCESS, SOCIAL, CONTACT AND WEB MARKETING SOLUTION incorporated herein by reference.

Temporal Links

Temporal links open user interfaces that are tied to gadgets. The type of gadget used is based on the type of link created or made available. An interactive user interface based on feeds that are interactive between gadgets is a process which creates a multi-dimensional capability through the calls upon data and actions from traditional linear functions in feeds to the user in a single model. The data feeds can be one of social media, from traditional databases or any other type of feed. This function of interaction, via user interface gadgets, with the users performing the redaction (the redactors) add process completely new elements of their own—which are subjects of this patent such as Smart Tags, or Tags on Meta Data, Captured data, data about data, which results in a algorithmic structure that provides relationships, and therefore capabilities in modifying front end user interactions and abilities, and back end work flow calls related to processes. This has the effect of creating an entirely new state machine flow, algorithm, functional user interface, interaction and communication model—alongside an opportunity for the redactor (users) to measure and control data elements. Via the unique user interface created with gadgets that interact through the gadget based redactors, new information, data and interactions are made possible.

The gadget units are combined in frequent, non-linear sequence to allow users to interact at various levels not previously accessible via social media, web sites and through feeds and sites such as RSS, blogs, search engines, feedback forms, data forms, email, SMS text messaging, and other forms of information and communication.

"User interface" or "UI" is defined as a model for building user interfaces quickly through the UI created for gadgets and behaviors. There is a three dimensional user interface element structure:

1) The interactive user interface, which is the "use" case of the gadgets, and,
2) The design user interface, which allows for the definition of a gadget, and, or,
3) The user interface which allows, via gadgets inside user interfaces, to define micro-gadgets The user interface, being combined via a single view or across multiple views which enable users interfaces to "follow" and via interaction across multi-tiered, multi-gadget based, user interfaces, or gadget to gadget. This interaction engages elements via UI's that make possible multi-tiered communication on a public, or secure private, level. Multiple UI views and interface gadgets, stand as inter-relational programmatic elements, interacting with each other, is the function of the 1to1ME Social & Communication user interface "UI"—which is at the core usability and invention of this model.

Hub

Figure 3:
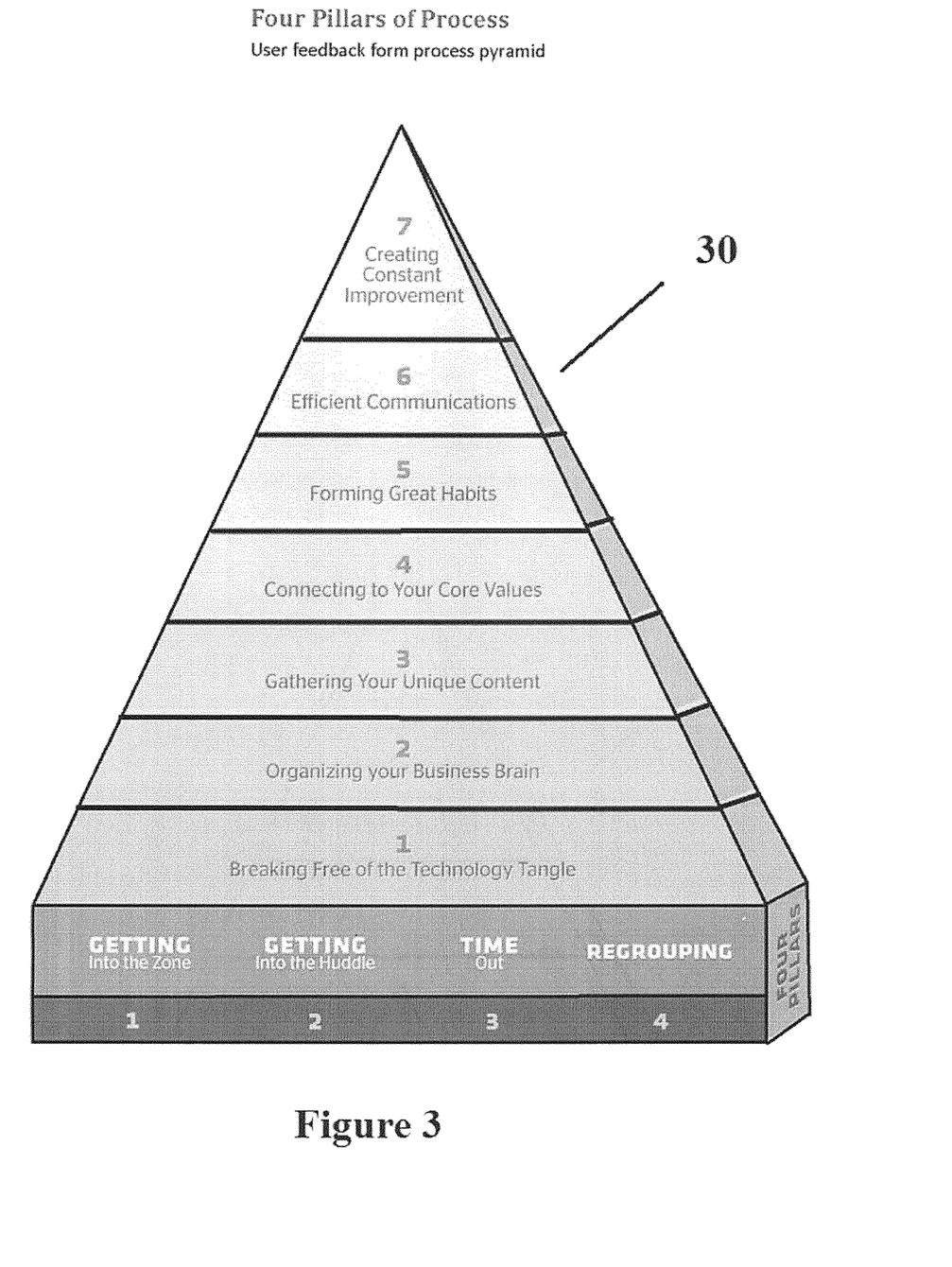
FIG. 3 is a diagram of a user feedback form process pyramid of one embodiment of the invention.

Referring to FIG. 3, the hub 30 is an aggregation of user defined user interfaces, each that produces or models a business relationship. For example, the user can select social spaces and establish a single space or hub as a user space. The user places a link which interrupts the social space capture and re-directs the new connection capture to the user space. The user space work flow pulls information from multiple sources such as Twitter, Facebook, eBay, RSS and Blogs and publishes that information in the user space. The user will build a list of "private" individual connections outside of user defined social spaces as a private connection and contact list. Thusly, the user can send actions from the user's private space for communications, e-mail and providing user private tracking and aggregation. The social spaces from which information is pulled provide presence and the user spaces provide private processes outside the disrupted state of social networks. Referential networking from outside spaces is created by disrupting the access to user information from a single location in a single space.

For example, in a real estate and mortgage transaction, the traditional state machine would see the real estate agent receive an offer to purchase or sell and then the mortgage broker would receive the application for a mortgage. The traditional transaction occurs between the buyer and the seller. In using the present invention, the buyer interacts directly with multiple sellers. The buyer would self-qualify for a mortgage through direct interaction with the lender. Legal and title documents would be produced and shared between the lender, the lawyer and the title registry.

In another example, in the operation of a pharmacy, physicians and patients are outside the system. In the traditional transaction, the pharmacy receives an order and completes the filling, shipping and billing of the order. In using the present invention, the physician or patient has access to the formulary, billing and shipping functions. The physician and patient establish the work flow and medication management through a web interface. The pharmacy fills the prescription but the billing and shipping activities by parties outside of the pharmacy.

In yet another example, the traditional state machine for communications management involves outbound VOIP, e-mail, text messaging, IM and other communications applications. The outbound communications generates inbound responses and an outbound auto-responder. In using the present invention, the auto-drive messaging delivers messages based on state actions set up by users by way of activity based interactions. A user begins a correspondence and sets up variables or "action points" in a communication, a web page, a social space, link tracking pixel, code or script variable in the appropriate communications medium. The tracking action is related to the state process interruption by way of a stage or step in the process. The process interruption is driven to the appropriate response allowing, for automated conversation or human interaction through the process mechanism.

Through the use of gadgets, the flub allows for users to define actions, complete and process actions, and add gadgets to their "hub" environment. The hub is the aggregation of the entity of spaces and gadgets which gives rise to a portal that is dynamically created by the users of gadgets.

Figure 4:
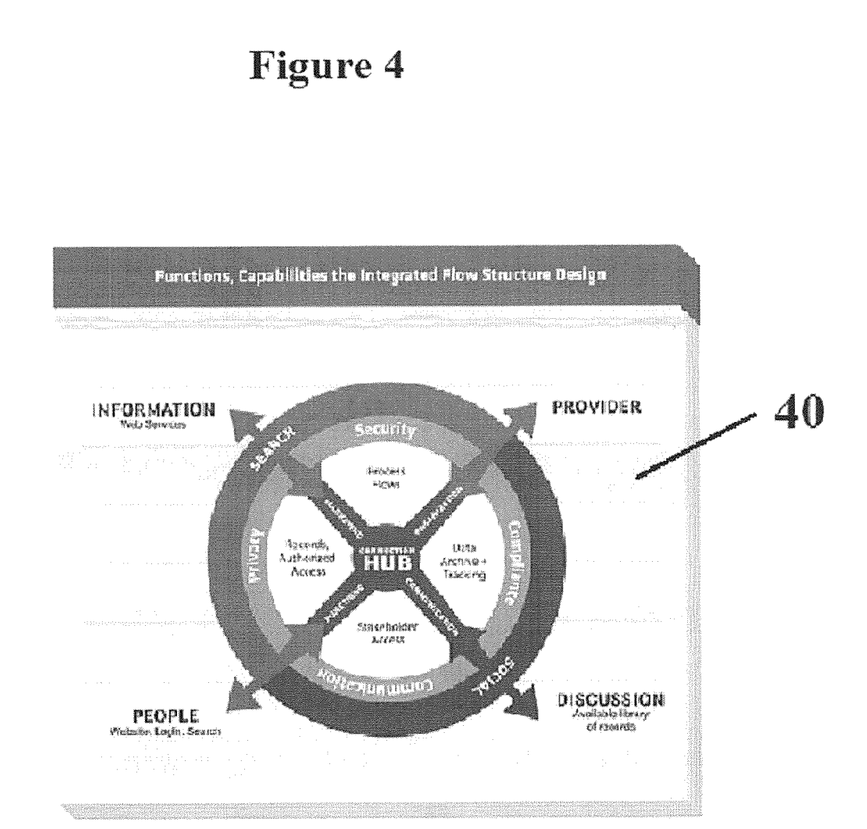
FIG. 4 illustrates a HUB of one embodiment of the invention.

When interacting with the data, we call this the Four Pillars of Process™ which is a way for users to input and interact with data and dynamically build an understanding of their use of media, communications and data for interaction and communication. The Four Pillars of Process are the steps for how to initially model and how enterprise developers or administrators understand how to build the initial foundation of the gadgets, chains and all the related activities described. One example of the Four Pillars of Process Model 40 is shown in FIG. 4.

This is represented through an interactive feedback form, which adds data from the users into the integrations and flows created by the interactive gadgets. Gadgets handle communications, internally and externally, which allows for merging of data from multiple sources. These can create various flows and or create various outputs. Thus, anything from creating a report, or creating a social media post, real time, or moderated, may be captured by the communications functions. The Gadgets allow for the triggers in which the communications calls occur—including the route (in-bound or out-bound), between users and or system automated communications.

Process Exchange Redactor User-integration packets (PERU™) aka (PERU Gadgets)

PERU is a model that describes the creation of how the chains across gadgets are created. It is a model for describing how they interact to create their "meta" process flows, in other words, process flows or work flows emanating from process flows created via the interaction across gadgets, and/or gadgets that interact with one another. PERU Application Packets are programs behind the gadget.

By having a number of gadgets associated with processes, the gadgets dynamically create new work flows. This creates a unique attribute, where processes that flow from interaction across gadgets, creates a "meta" workflow, or Process Flow, in and of itself Thereby, creating and combining gadget "chains" a process flow is created dynamically.

Process Flows

We can implement processes and model them across gadgets that interact with one another. In other words, it can require multiple gadgets to conduct a process. In effect, in the case of compliance, where multiple documents or roles, agreements are required, the execution and process in one gadget unit, can be combined, with another, and another, in the form of a chain, that will re-assemble into a functional gadget that then acts on the information the chain has received to create a new process. Where each gadget is a file and performs in and of itself, the process flow chain created via the gadgets spawns a new process. This gives rise to the efficacy of the compliance functions, where an assembly of gadgets interacting with one another, are effectively spawning a complete function that has an infinite set of outcomes assembled because of the interaction. Hence, no process exists prior to the process created, and the process created afterward can be one of an infinite number of possibilities, as the change in a gadget or interaction in a gadget in the chain, will stimulate a new series of executions, which now become the fingerprint for a new set of processes. This enables security, as one example, on the one hand, and a footprint or fingerprint, on the processes created, modeled and executed on the other hand.

PERU is a combined application programming user interface and application language utilizing inter-operable gadgets that enables process redactor interface into state machine and application program interface (API) application. The PERU packets are programed for any type of user interface variable, and can be easily combined into a single user interface or across multiple interfaces. PERU application packets utilize combined programming languages—when developed they provide various user interface elements that perform data capture, queries, input, output, analytic algorithms and interface into state machines.

The application of PERU's are the functions that allow linear state machine processes to be interrupted in functional structures that provide users the ability to interface and modify or redact the process into a new functional state machine—thereby providing new usability, information, analytics and/or workflows.

P.E.R.U Based—Social, Syndication, Share Hub

Through the use of PERU gadgets, organized on a user interface hub, multiple levels of interactions can be accomplished:

1) Public
2) Member
3) Private

Each space established provides additional layers of state management interface and reductions, as we'll as publishing and privacy capabilities based on the overall structure of the processes. Processes are combined in a seamless user interface hub.

In the Public 1to1ME—Social & Communication space Hub—the use of social spaces, search and RSS syndication, Blog, communication media and multimedia is combined. Through the use of Smart Tag technology, the tabs track interactions and presence both inside the PERU gadget and to name the space. In this interaction the space become a dynamic information engine, visible to search engines bots and crawlers. Smart Tags enable the searching of a space, or the optimization of a space.

Figure 5:
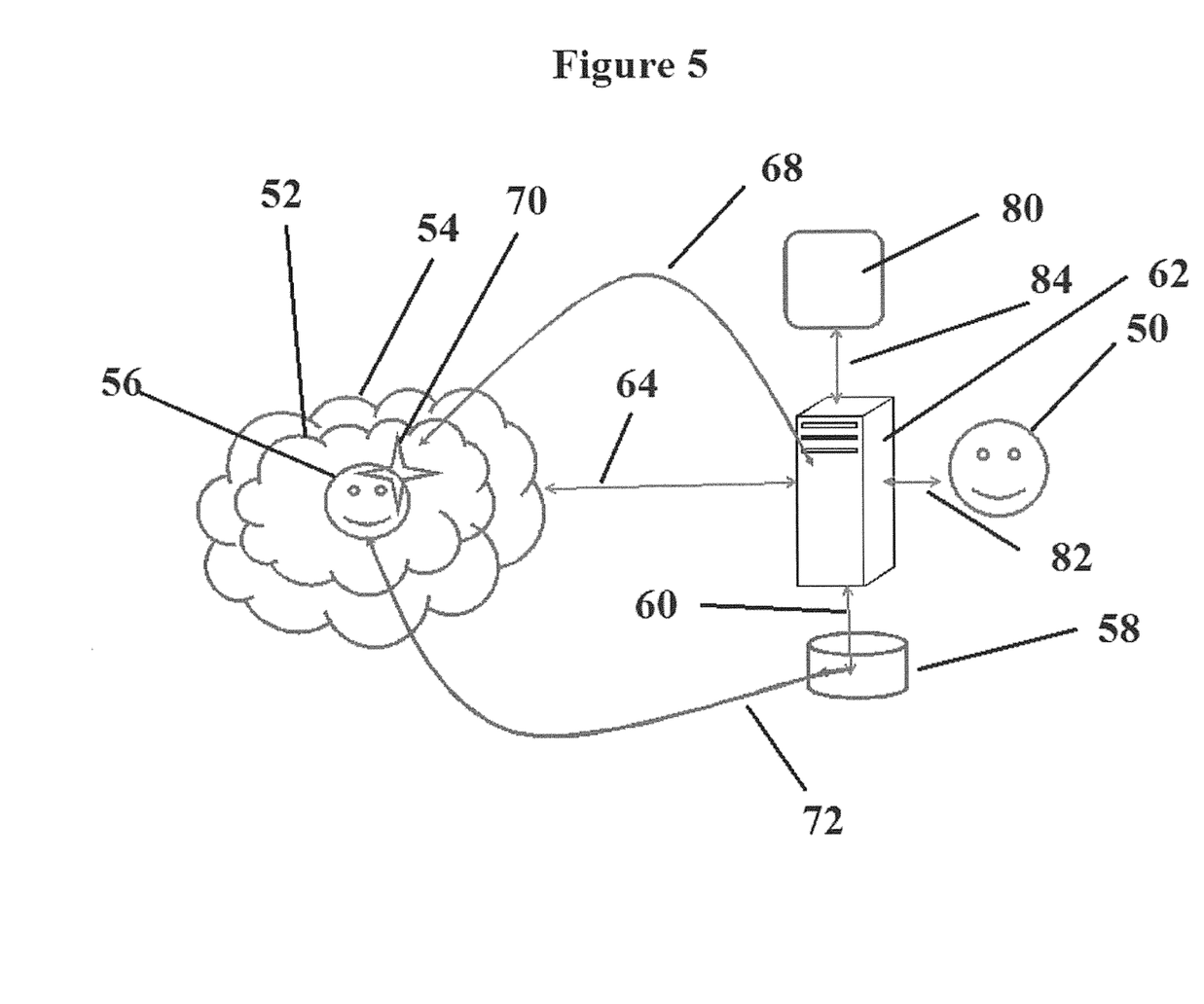
FIG. 5 illustrates one embodiment of the system of the invention.

Referring to FIG. 5, the invention comprises a method for creating a connected market using gadgets and social media interaction units. The users 50 will define a plurality of virtual spaces 52 on the World Wide Web 54 containing social content 56 of interest to the users. A private and secure virtual space 58 is created in which to place the social content of interest to the users 50. The private and secure virtual space is generally a storage device connected 60 to a computer 62 having access 64 to the World Wide Web 54. A user will tag 68 social content of interest 56 using a smart tag 70. Using a plurality of gadgets the invention will intercept and obtain 72 tagged social content from the virtual space 52 and place it in the secure and private virtual space 58. The invention provides for a plurality of interactive user interfaces 80 for the plurality of gadgets so that the plurality of users 50 can interact 82 and 84 with the tagged social content inside of the secure virtual space 58. The users can then redact or edit the tagged social content to suit their needs. The invention, using gadgets will modify the plurality of user interfaces based upon the redacted and tagged social content.

The tagged social content may be in a variety of languages such as XML, RSS, ODBC, Twitter, Facebook and eBay. The gadgets are able to communicate over all of these language domains. The step of tagging the social content 68 is executed by the users 50; however, tagging can also occur using the gadgets which will tag the social content based upon user interaction with the social content. The smart tags 70 are behavioral tags and capable of stimulating a gadget to engage a software program.

Figure 6:
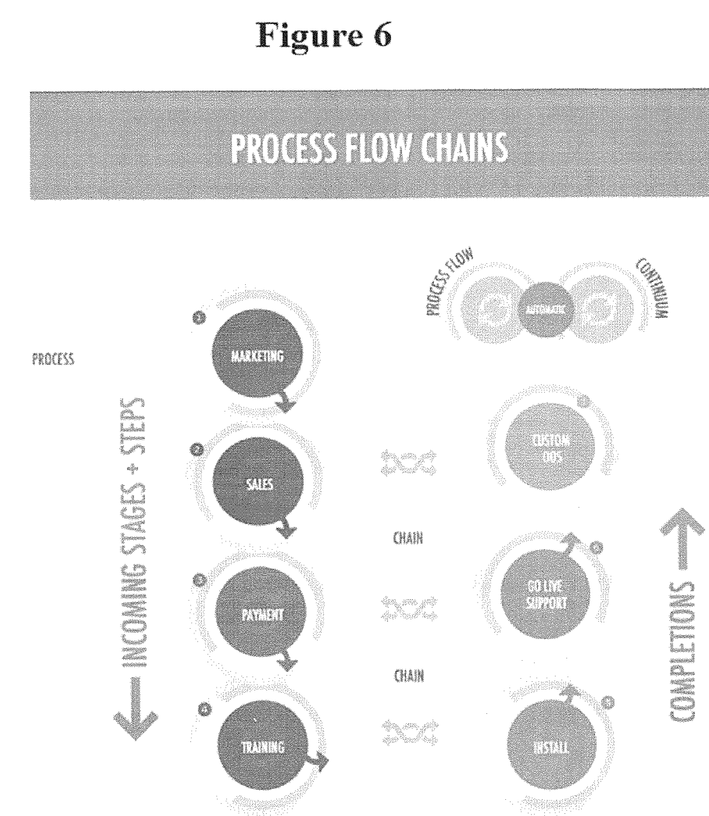
FIG. 6 illustrates one example of a work flow process created by gadgets of the invention.

In a preferred embodiment of the invention, the gadgets are interactive and the secure virtual space is a user-interactive process space. The gadgets can be combined into non-linear sequences so that the users can interact with the tagged social content at various levels. Micro-gadgets can be embedded within gadgets as illustrated in FIG. 6.

Figure 7:
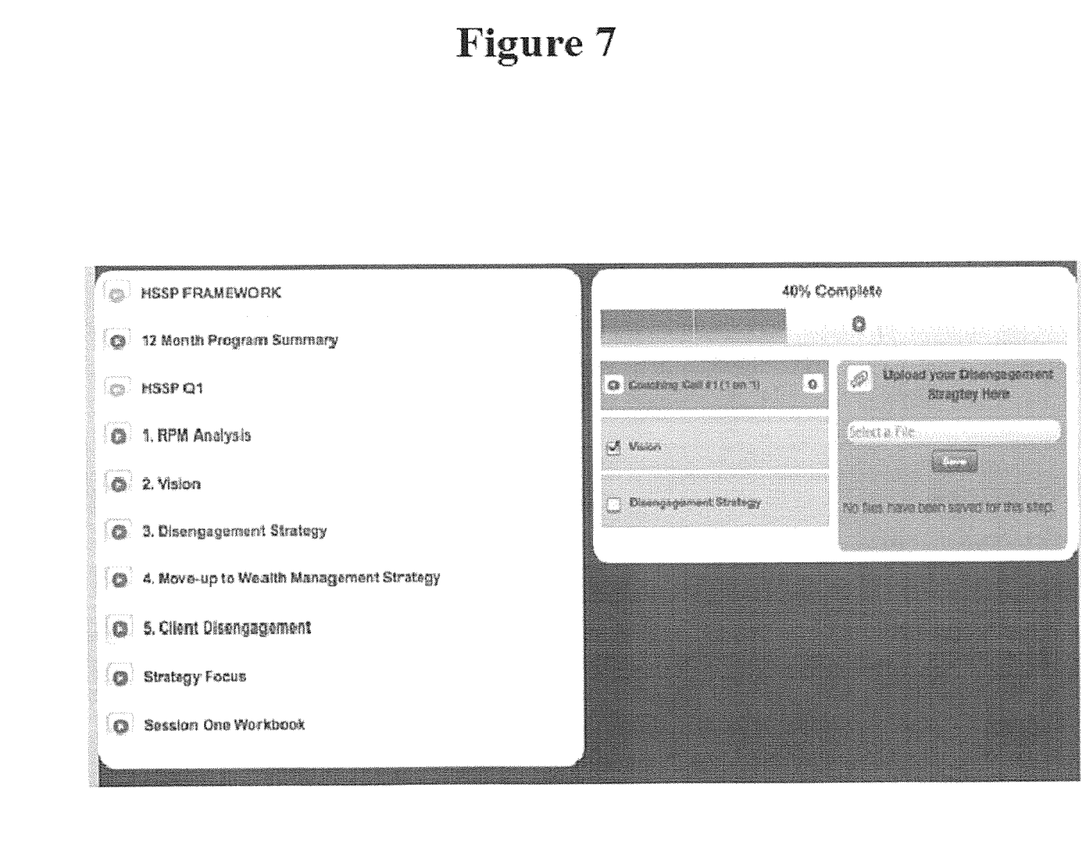
FIG. 7 illustrates one example of micro-gadgets embedded within gadgets.

Furthermore, in a preferred embodiment of the invention, the multiple user interfaces can be combined so that the plurality of gadgets interact with each other to create work flows and process flow chains as shown in FIG. 7.

Referring back to FIG. 5, the system of the invention which is a computer implemented system for creating a connected market using gadgets and social media interaction units comprises a plurality of virtual spaces 52 on the World Wide Web 54 containing social content 56 of interest to a plurality of users 50. A computing apparatus 62 is connected 64 to the World Wide Web 54 and comprises a secure and private virtual space 58 in which to place social content of interest 56 for the plurality of users. Included in the computing apparatus is software comprising a plurality of gadgets for tagging 68 the social content of interest with behavioral smart tags 70 and for intercepting and obtaining 72 the tagged social content from the plurality of virtual spaces and moving it to the private and secure virtual space 58 for user interactions. A plurality of interactive user interfaces 80 for the plurality of gadgets is provided so that the plurality of users can interact with the tagged social content inside of the secure virtual space.

The computing apparatus will further comprise an at least one server connected to the World Wide Web, at least one data storage device and a web browser. The plurality of gadgets is interoperable to create a user interface, perform data capture and execute analytic algorithms.

Accordingly, the scope of protection of this invention is limited only by the following claims and their equivalents.

What is claimed is:

1. A method, for creating a connected market using gadgets and social media interaction units, comprising the following steps:
   a. Defining a plurality of virtual spaces on the World Wide Web containing social content of interest to a plurality of users;
   b. Defining a secure virtual space in which to place said social content of interest to said plurality of users;
   c. Tagging the social content of interest using a smart tag which enables searching of said plurality of virtual spaces on the World Wide Web;
   d. Using a plurality of gadgets, which are separate and distinct from social content generators, each of the gadgets performing data capture, queries, input, output, and analytic algorithms to search and retrieve intercept and obtain tagged social content from said plurality of virtual spaces;
   e. Placing the tagged social content inside of said secure virtual space which serves as an interactive processing space;
   f. Providing a plurality of interactive user interfaces for said plurality of gadgets so that the plurality of users interact with the tagged social content inside of the secure virtual space, with the gadgets interacting with each other to create unique work flow and process flow chains for each user dependent upon the tagged social content which is searched and retrieved; and
   g. the users redacting the tagged social content and modifying the plurality of interactive user interfaces based upon said redacted tagged social content.

2. The method of claim 1 further comprising the step of the users redacting the tagged social content.

3. The method of claim 2 further comprising the step of modifying the plurality of user interfaces based upon said redacted tagged social content.

4. The method of claim 1 wherein said tagged social content languages comprises at least XML, RSS, ODBC, Twitter, Facebook and eBay.

5. The method of claim 4 wherein the plurality of gadgets communicates over all of said languages.

6. The method of claim 1 wherein the step of tagging the social content is executed by the users.

7. The method of claim 1 wherein the step of tagging the social content is executed by a gadget based upon user interaction with the social content.

8. The method of claim 1 wherein said smart tag is a behavioral tag.

9. The method of claim 8 wherein said behavioral tag stimulates a gadget to engage a software program.

10. The method of claim 1 wherein the users interact with the tagged social content of interest using a graphic user interface.

11. The method of claim 1 further comprising the step of combining the plurality of gadgets into non-linear sequences so that the users can interact at various levels.

12. A computer implemented system for creating a connected market using gadgets and social media interaction units comprising:
   a. A plurality of virtual spaces on the World Wide Web containing social content of interest to a plurality of users;
   b. A computing apparatus connected to the World Wide Web and comprising a secure virtual space in which to place said social content of interest to said plurality of users, said computing apparatus comprising at least one server, connected to the World Wide Web, having at least one computer readable data storage device and a web browser;
   c. Software comprising a plurality of gadgets for tagging the social content of interest with behavioral smart tags which enables searching of said plurality of virtual spaces on the World Wide Web and for searching and retrieving intercepting and obtaining the tagged social content from said plurality of virtual spaces;
   d. A plurality of interactive user interfaces for said plurality of gadgets for transporting the tagged social content to said secure virtual space so that the plurality of users interact with the tagged social content inside of the secure virtual space, the plurality of gadgets interacting with each other to create unique work flow and being interoperable to create a user interface, perform data capture and execute analytic algorithms; and
e. the users redacting the tagged social content and modifying the plurality of interactive user interfaces based upon said redacted tagged social content.

\* \* \* \* \*